April 21, 1925. 1,534,842

S. EVERS

GATE

Filed June 11, 1924

Inventor
S. Evers

Attorney

Patented Apr. 21, 1925.

1,534,842

UNITED STATES PATENT OFFICE.

STEPHEN EVERS, OF FREEBURG, MISSOURI.

GATE.

Application filed June 11, 1924. Serial No. 719,361.

*To all whom it may concern:*

Be it known that I, STEPHEN EVERS, a citizen of the United States, residing at Freeburg, in the county of Osage, State of Missouri, have invented a new and useful Gate; and I do hereby declare the following to be a full, clear, and exact description of the invention, such as will enable others skilled in the art to which it appertains to make and use the same.

The invention relates to gates, and has for its object to provide a device of this character mounted on an inclined tiltable rod and normally in closed position, and to provide wheel actuated depressible members at opposite sides of the gate for reversing the direction of inclination of the inclined rod whereby said gate will move to open position under the force of gravity.

A further object is to provide manually actuated lever means at opposite sides of the gate, and forming means whereby the gate may be manually operated from opposite sides thereof by the movement of the tiltable rod to inclined positions.

A further object is to provide in connection with the manual means for operating the gate means for holding the manual operating means in operative or inoperative position, especially during a passage of the vehicle through the gate.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
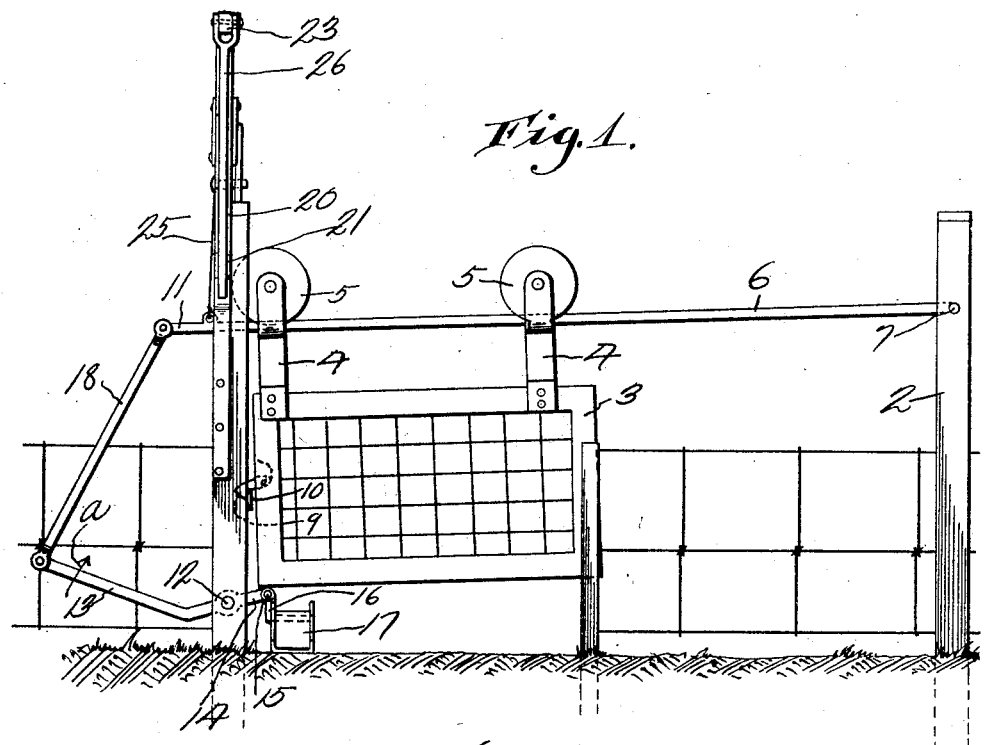
Figure 1 is a view in elevation of the gate.

Referring to the drawing, the numerals 1 and 2 designated spaced fence posts and 3 the gate. Extending upwardly from the gate 3 at its upper side are hangers 4, the upper ends of which hangers are provided with grooved wheels 5, which wheels are mounted on the inclined gate operating rod 5. Gate operating rod 6 has one of its ends pivotally connected at 7 to the gate post 2, and inclines downwardly towards the gate post 2, and extends through the vertical opening therein. It will be seen that when the rod 6 is in position shown in Figure 1, the gate 3 will move by gravity towards the gate post 1 until its pivoted catch 9 hooks over the keeper 10 carried by the post 1, consequently the gate 3 is locked in closed position, thereby preventing the same from being opened by animals. It will also be seen that when the inclined rod 6 is moved upwardly at its free end 11, to a position whereby the rod 6 will incline towards the gate post 2, the latch 9 will be moved out of engagement with the keeper plate 10, and the gate 3 will move by force of gravity towards the gate post 2 on the rod 6, and consequently will move to an open position, thereby allowing a vehicle or a person to pass through the gate opening.

Pivotally connected at 12 in the opening 3 of the post 1 adjacent the lower end thereof is substantially a horizontally disposed lever 13. The inner end 14 of the lever 13 is in turn pivotally connected at 15 to a bracket 16, and to which bracket the inner adjacent ends of the upwardly inclined channels 17 are pivotally connected. It will be seen that when a driver of a vehicle approaches the gate 3 from either side thereof, he may easily guide the vehicle so that the wheels at one side thereof will be received in one of the channels 7, thereby depressing the inner end thereof and rocking the outer end of the lever 13 upwardly in the direction of the arrow *a*, and the lever 13 will be held at its outer end in raised position as long as the wheels of the vehicle are on either channel 17, therefore it will be seen that the gate supporting rod 6 will be held in raised position inclining towards the gate post 2 by the connecting rod 18, and consequently upon the initial depression of one of the guide channels 17 the rod 6 is raised at its free end to a position where the gate 3 will move by gravity towards the gate post 2, and as soon as the vehicle passes off the channel members the rod 6 will drop downwardly at its free end under the weight of the gate, which action will allow the gate to move to closed position as shown in Figure 1, by gravity, and the connecting rod 18 will rock the lever 13 on its pivotal point 14, and again raise the adjacent pivoted ends of the channels 17 to inclined positions, so that they will receive the wheels of a vehicle approaching the gate.

Figures 2, 3, 4:
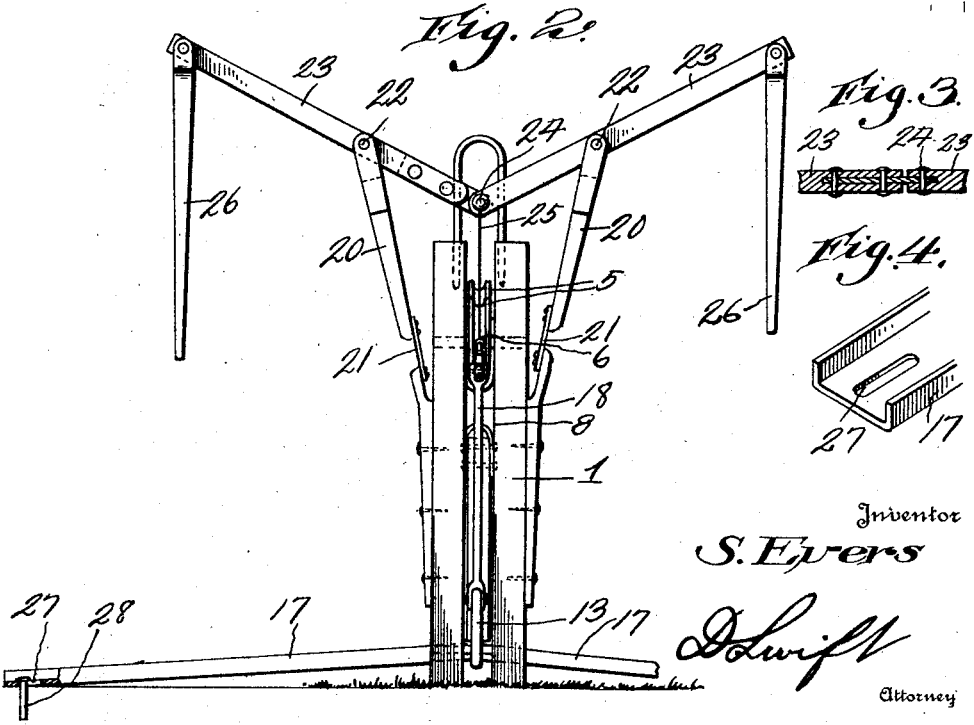
Figure 2 is a side elevation of the gate, showing the gate operating mechanism.
Figure 3 is a detail sectional view through the connected ends of the operating levers.
Figure 4 is a perspective view of one end of one of the wagon wheel receiving channels.

The gate may be manually operated if desired without depressing the members 17 by means of the vehicle wheels. To accomplish this result the opposite sides of the gate post 1 are provided with upwardly extending diverging arms 20, which arms are provided with springs 21, whereby they may spread apart, the purpose of which will presently appear. Pivotally connected at 22 to the upper ends of the diverging arms 20 are rockable levers 23, which levers normally extend downwardly towards each other, and are pivotally connected at 24, and are also connected to the tiltable rod 6 by means of a flexible member, for instance the casing 25, therefore it will be seen that the tiltable rod 6 may be moved independent of the levers 23, when the gate is actuated by the channel members 17. It will be noted by inclining the levers 23 downwardly and inwardly, the springs 21 carried by the arms 22 will maintain the outer ends of the levers 23 in raised position as shown in Figure 2, at all times. During the manual operation of the gate by the operator grasping either of the pivoted handles 26, and pulling downwardly on the same, the springs 21 will be bowed, and the upper ends of the arms 20 spread apart, thereby allowing the pivotal point 24 to pass upwardly to a position where the arms 23 will incline upwardly towards each other, for instance during a gate opening operation. When the arms 23 incline upwardly towards each other, the springs 21 will maintain the gate in raised position until the operator passes through the gate, and forces upwardly on one of the pivoted handle members 26, with sufficient power to overcome the springs 21, at which time the guide rod 6 will be lowered to an inclined position for allowing the gate 3 to move to closed position by gravity. The outer ends of the wheel receiving channels 17 are provided with elongated slots 27, through which a guide rod 28 extends, which guide rod may be driven into the ground if desired.

From the above it will be seen that a gate controlling mechanism is provided, whereby a gate may be automatically opened and closed upon the approach of a vehicle and upon the passage of the vehicle through the gate opening, and manual means is provided for opening the gate independent of the vehicle actuating means, thereby allowing pedestrians to easily operate the gate.

The invention having been set forth what is claimed as new and useful is:—

The combination with a pivoted inclined rod, a longitudinally movable gate mounted on said rod and moved to closed or open position by gravity, vehicle actuated means for raising the free end of said rod, of manual means for raising the free end of said rod, said manual means comprising pivoted levers, said levers being pivotally connected to yieldable arms and extending downwardly towards each other and pivotally connected together, a flexible connection between the pivotal point of said levers and the free end of the rod, said spring arms forming means for holding the tiltable rod in raised position against the weight of the gate and the rod.

In testimony whereof I have signed my name to this specification in the presence of two subscribing witnesses.

STEPHEN EVERS.

Witnesses:
B. I. WEGMAN,
THEO. J. NEUNER.